Aug. 24, 1926.
J. G. DELY
1,597,345
PROCESS RELATING TO GAS PURIFICATION BY AMMONIACAL CUPROUS SOLUTIONS
Filed August 16, 1923
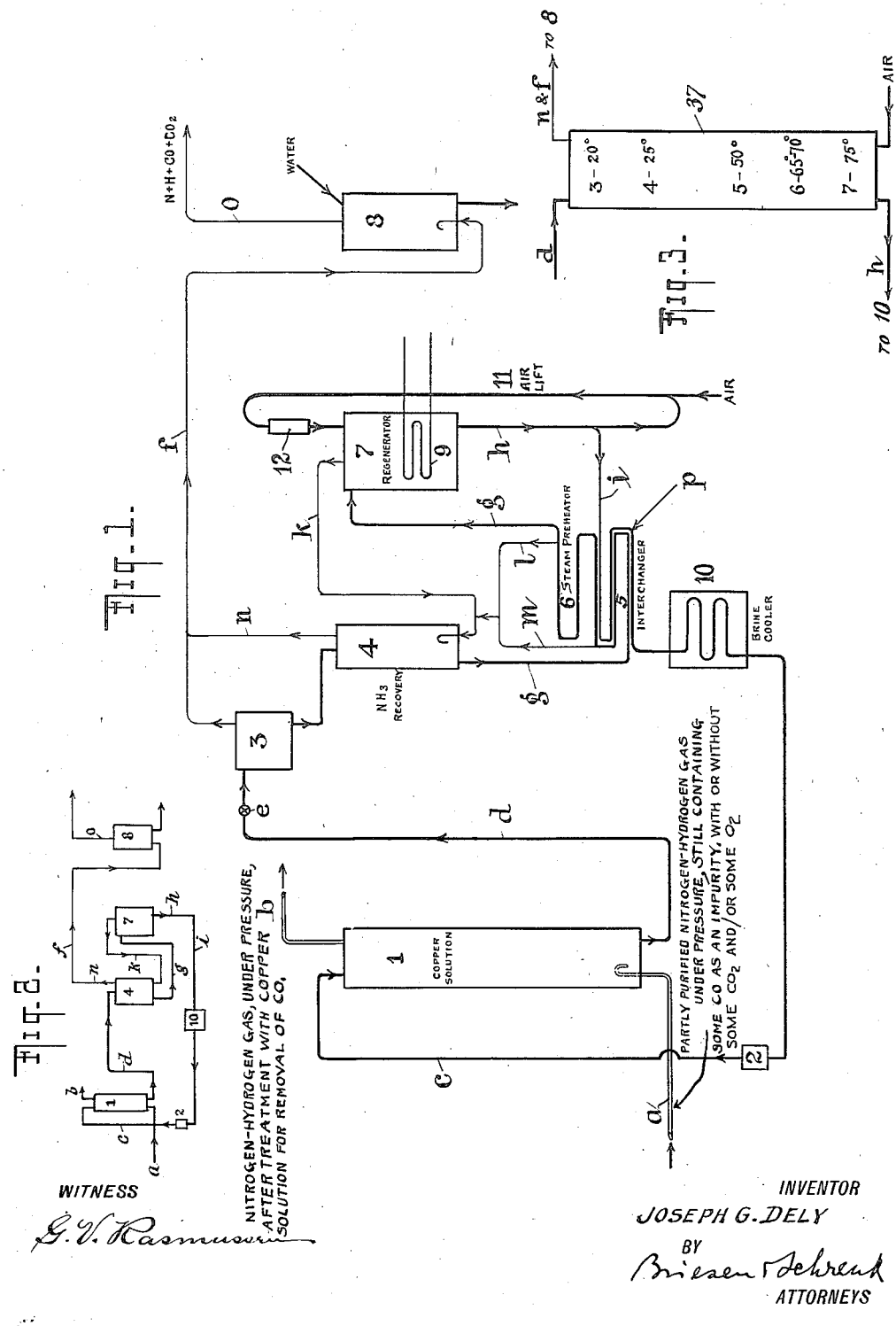
WITNESS
INVENTOR
JOSEPH G. DELY
BY
ATTORNEYS Patented Aug. 24, 1926.

1,597,345

UNITED STATES PATENT OFFICE.

JOSEPH G. DELY, OF SYRACUSE, NEW YORK, ASSIGNOR TO ATMOSPHERIC NITROGEN CORPORATION, OF SYRACUSE, NEW YORK, A CORPORATION OF NEW YORK.

PROCESS RELATING TO GAS PURIFICATION BY AMMONIACAL CUPROUS SOLUTIONS.

Application filed August 16, 1923. Serial No. 657,682.

This invention relates in its more particular application to one part of the process of catalytically producing ammonia from nitrogen and hydrogen gas, to wit, that part of said process wherein gas intended for participation in the catalysis is to be purified with respect to the elimination of carbon monoxide therefrom. The invention contemplates a variety of advantageous objects and results which will appear in detail during the course of the specification.

The invention may be carried out in connection with apparatus such as is illustrated in the accompanying drawings in which Fig. 1 represents diagrammatically the procedure as carried out in practice. Fig. 2 is a simplified diagrammatic representation of the same method of procedure and Fig. 3 is a possible modification.

It will be understood that in this specification the invention will be described with particular reference to the process of making synthetic ammonia, although it is apparent that the invention may be employed in other connections where similar problems are encountered. Speaking generally, the synthetic ammonia process involves the action of a catalyst upon gas containing nitrogen and hydrogen in the proportion of 1:3 and it will be apparent that for the purposes of such catalysis the gas should be as free as possible from impurities. According to that type of synthetic ammonia process which is known as the de Jahn process, the gases which are to participate in the catalysis are first produced as a mixture in which the nitrogen content is approximately one-third of the sum of the hydrogen and carbon monoxide contents by volume. This gas is brought together with steam into contact with a catalyst adapted to the oxidation of carbon monoxide to carbon dioxide with the production of an equal volume of hydrogen. The resulting gases are then subjected to a pressure of approximately 95 atm. and while under such pressure treated for the removal of impurities. One of these impurities consists of a remnant of carbon monoxide which is eliminated by passing the gases under pressure through an ammoniacal cuprous solution. It is at this point that several problems and difficulties have arisen which it is the object of the present invention to overcome.

In the drawings $a$ represents the conduit through which the gases to be purified enter the tower 1 and $b$ the conduit through which gases, deprived of their CO content, pass to the next operation. The tower 1 is filled with suitable packing material and a continuous supply of ammoniacal cuprous solution flows through it. The solution is, for example an ammoniacal copper carbonate solution having the following composition expressed as grams per 100 cc. of solution: total copper, 6–9; cupric copper, 0.3–0.5; total ammonia, 11–16; total carbon dioxide, 10–15.

Solutions of more or less copper content can be used, in which case a corresponding change in the other constituents can also be made. However, the greater the cuprous copper content of the solution, the greater is its absorbing capacity for carbon monoxide. It is obvious that the foregoing composition is given by way of illustration only, and that the invention is applicable to any ammoniacal cuprous solution which may be operative for the purposes under consideration.

Referring again to the drawings, the pump 2 delivers a continuous supply of the solution through the pipe $c$ into the tower 1, such solution in its downward travel absorbing the carbon monoxide from the gas flowing upwardly through the tower 1 from $a$ to $b$, and the solution with the absorbed carbon monoxide leaving the tower through the pipe $d$. I prefer to carry out the foregoing treatment at a low temperature instead of at ordinary or room temperature and preferably at a temperature near the freezing point, but without causing the solution to freeze or any of its dissolved components to separate out in solid form. With a solution of the type hereinabove described and other conditions as described the preferred operating temperature is about zero degrees, at which temperature under the stated conditions substantially all of the carbon monoxide present in the gas to be purified is absorbed. The advantages of this procedure will be elaborated at a later point.

Referring again to the drawings and presupposing that the gas to be purified in the line $a$ to $b$ is under a pressure above atmospheric, reducing valve $e$ serves the purpose of relieving the corresponding excess pressure of the circulating fluid. The fluid thus relieved of excess pressure enters the vessel 3 from which it continuously flows into a tower 4. Any gas accompanying the fluid or becoming disassociated therefrom in the vessel 3 escapes through the pipe $f$ and is led into the scrubbing tower 8. The liquid, after passing through the tower 4, flows through $g$ to a heat interchanger 5, thence through a steam preheater 6, and finally into the regenerator tank 7. The tower 4 may be of any desired construction and may, for example, be similar in that respect to tower 1, but as indicated in the drawing, smaller in size. A temperature of approximately 70° to 75° C. is preferably maintained in the regenerator tank 7 by the steam coil 9. From the regenerator tank 7, the hot liquid, now having a desired cupric copper concentration, flows through the line $h$—$i$ in heat exchange relation with pipe $g$ through the interchanger 5 and thence into the brine cooler 10. The temperature effect of these various arrangements is approximately as follows: The fluid enters the tower 4 at 15° to 20° C. and leaves the tower at approximately 30° C., the temperature being raised in the interchanger 5 and preheater 6 to approximately 65° finally reaching 70° to 75° C. in the regenerator tank 7. By heating the solution to this temperature substantially all of the absorbed carbon monoxide is driven out and evolved from the solution. As the hot liquid from the regenerator tank 7 passes through the interchanger 5, its temperature is very materially reduced prior to its introduction into the brine cooler 10 in which the temperature of the liquid is brought to approximately zero. Air is injected and brought into intimate contact with the solution in the regenerator tank 7 by means of the air lift 11, which withdraws a portion of the liquid from the pipe $h$, whose part 12 is preferably of enlarged cross section and filled with suitable packing to assure intimate contact of the materials passing through. The air thus introduced has the function of oxidizing cuprous copper to the cupric condition and, by the proper control of the volume of admitted air a relatively constant cupric condition may be maintained at a point corresponding generally to a point in the line $i$ and said cupric concentration at this point is, of course, sufficient to assure preservation of at least some cupric copper concentration in the solution by the time the circulating fluid again reaches the regenerator tank 7. Any gas evolved in the regenerator tank 7 is caused to flow through the connection $k$ into the tower 4 and similar connections $l$ and $m$ may also be led to the tower 4 from the preheater 6 and the interchanger 5, respectively. Any gas leaving the tower 4 flows through the pipe $n$, preferably joining the pipe $f$, the gas being led into the scrubbing tower 8, where it is scrubbed with water while the residual gas leaves through the outlet connection $c$. The effect of the operations is as follows: The solution recovered from the tower 1 contains substantially all of the CO which was present in the gas entering the tower 1 through $a$. The problem is to regenerate the solution economically to adapt it for re-use in a regenerated condition in the tower 1. This is accomplished by the process thus far described. By the term "regenerated" I intend to refer to a condition whereby the solution is restored to substantially the same condition in which it originally entered the tower 1, i. e., a condition such that the solution is substantially freed from carbon monoxide and that an amount of cuprous copper is oxidized to the cupric state equivalent to the amount of cupric copper which has been reduced to the cuprous state during the preceding cycle. Of course, the concentrations of free ammonia and carbon dioxide must also be maintained within such limits as will produce the proper medium for the dissolved copper and this, as is heretofore explained, is one of the particular objects of the invention. By this means the regenerated solution is returned to the solution inlet of tower 1 in a condition of relative constancy of composition. In the vessel 3 the gas which flows out through $f$ consists mainly of CO, nitrogen, and hydrogen. In the tower 4, therefore, the entering liquid contains practically all of the ammonia of the original solution. As the liquid is heated in the interchanger 5, the preheater 6 or the regenerator tank 7, there are driven off very substantial volumes of ammonia and $CO_2$ as well as CO. The function of the air-lift 11—12 is to maintain a certain amount of cupric copper in the solution, a part of the CO present in the solution being at the same time oxidized to $CO_2$. Incidentally the air causes the tank 7 to give off increased volumes of ammonia and $CO_2$. Whatever ammonia or $CO_2$ or CO are released or driven off during any part of the passage of the fluid through the tower 4 to the tower 1, including any gases added as the result of the use of the air-lift 11, are all directed into the tower 4, where, by reason of the temperature maintained therein, the relative rates of solubility of the various gases, and the condition of the liquid, a condition of selective absorption is maintained, such that the major portion of the ammonia gas is reabsorbed while only so much of the $CO_2$ escapes as represents surplus $CO_2$ with respect to the proper constitution of the solution in its original state. In other words, only so much $CO_2$ escapes through the tower 4 (except, of course, such $CO_2$ as may be carried into the system at $a$) as is equivalent to the $CO_2$ formed by the oxidation of CO through the air-lift 11 or otherwise it will be apparent that whatever takes place in the various parts of the system from the tower 4 onward, no gas is allowed to escape without being first treated by the as yet unregenerated liquid in the tower 4, and in the tower 4 the conditions are such as to be favorable to the retention of any ammonia gas as well as of so much of the $CO_2$ as was originally contained in the solution. There will naturally be a slight amount of ammonia in the gas passing through $n$ and $f$ and which therefore is not automatically returned to the copper solution by my process. This is compensated for by introducing as at $p$ regulated amounts of pure ammonia gas, the amount of which is, however, insignificant when contrasted with the gas that would have had to be added if the regeneration system had been conducted as an open system or under conditions other than those described. This ammonia in the gas passing through $n$ and $f$ is recovered as ammonia liquor in the scrubbing tower 8.

Obviously the temperature conditions prevailing in the tower 4 are of great importance and it should not be so operated as to give a time of contact longer than is necessary for the desired ammonia retention. When so operated it will be found that the absorption of the ammonia is selective with respect to the carbon dioxide of the gas. That is to say the carbon dioxide formed during the regeneration by oxidation of some of the absorbed carbon monoxide (particularly in regenerator tank 7) and evolved, is not absorbed, but passes out with the exit gas at $n$. Furthermore, as the solution in 4 is already relatively saturated with carbon monoxide, the absorption of the latter is small and in any case immaterial, as final regeneration takes place at points beyond the tower 4 in the apparatus 5, 6 and 7. The net result is that the major portion of the evolved ammonia and it only, is recovered and returned to the cuprous solution uncontaminated with injurious or objectionable impurities, such as carbon monoxide and carbon dioxide and that both the ammonia and $CO_2$ contents of the cuprous solution are maintained constant so that it can be used indefinitely; and all of this is accomplished without interference with or objectionable complication of the regeneration procedure, but in direct conjunction therewith.

A certain amount of heat is evolved during the absorption in the tower 4 and it is advisable for efficient operation not to allow the temperature of the exit solution to rise much above 30° C. and preferably not above 25° C. Practical experience with the process has demonstrated that over 80% of the ammonia content of the gas evolved during the regeneration of a copper solution such as the one for which the formula has been given, can be returned directly to the copper solution and with practically no retention of the carbon dioxide formed during regeneration so that the carbon dioxide content of the copper solution remains practically constant and unchanged.

By the terms "pactically constant" and "unchanged" I do not mean that the total carbon dioxide content of the copper solution remains continuously and absolutely fixed. As a matter of fact, it does vary with changes in conditions such as the temperature of regeneration, temperature of operating the recovery tower 4, time of contact of gas in 4, etc. Then again, if the carbon dioxide content of the copper solution is initially relatively low with respect to its ammonia content, it will at first gradually increase in amount until it reaches a value corresponding, for example, to that of 10 to 15 grams per 100 cc. in the case of my preferred solution. The copper solution will then begin to exert its full selective absorbing power in the tower 4 and no further permanent increase in its $CO_2$ content will take place. Again, if the carbon dioxide content of the solution is initially high with respect to its ammonia content, it will at first gradually decrease in amount until it reaches a value corresponding to 10 to 15 grams per 100 cc. in the case of my preferred solution and under the conditions of operation as described. In other words there is no steady and continuous increase or decrease in the total carbon dioxide content of the cupper solution but a condition of equilibrium is soon reached, so that the same copper solution can be used in conjunction with my recovery process for an indefinite period without experiencing any difficulty due to its carbon dioxide content and without having to take any additional or special measures for its control; for example, during a month's operation with a solution whose total copper content was 8 to 9 grams per 100 cc. and the total ammonia 14 to 17 grams, the total $CO_2$ content fluctuated within the range of 10 to 15 grams, and averaged 12.7 grams. For all practical operating purposes, therefore, the total carbon dioxide content of the solution remains constant and it is in this sense that the solution is referred to as remaining practically constant and unchanged.

This feature of the process holds true also in case the crude gas to be purified contains some $CO_2$ as well as CO. In this case the $CO_2$ of the gas evolved passing through $f$ is equivalent to the CO oxidized to $CO_2$ in the system plus the $CO_2$ initially absorbed from the crude gas.

The ammonia content of the gas evolved during regeneration increases as the temperature of the regenerating solution is raised. The gas evolved from the regenerating apparatus 6 and 7 is therefore the most concentrated in ammonia and I have found that the advantages of my invention are obtained if in carrying out the process only the gas from 6 and 7 is passed through the recovery tower 4 while the gas from the interchanger 5, instead of leading through $m$ into the tower 4, is allowed to communicate with the scrubbing tower 8 either directly or through connection with the lines $n$ or $f$. Generally, however, it is preferred to pass through the recovery tower 4 all of the gas evolved from the regenerator solution after it leaves the recovery tower 4, i. e. all of the gas evolved either in 5, 6 or 7.

Attention has already been called to the fact that the preferred temperature in the recovery tower 4 is not higher than between 15° to 25° C. This presupposes a temperature of approximately zero of the solution entering the tower 1 through $c$. The use of this temperature in the solution entering the tower 1 involves a number of incidental advantages of considerable importance. The capacity is increased without any loss in efficiency, i. e. the amount of gas purified per unit of time with a given apparatus may be increased without any unfavorable effect on degree of carbon monoxide removal; or the same amount of gas may now be purified to the same extent with a smaller apparatus. Furthermore, the carbon monoxide is more completely removed when the solution is maintained at the specified low temperature. This feature is of considerable importance in those cases in which the ammonia catalyst which ultimately operates upon the gases from $b$ is or becomes increasingly sensitive to traces of carbon monoxide in the gas. Then again, less solution is required per unit of gas purified and when the low temperature solution is used, the water and carbon dioxide content of the exit gas at $b$ is decreased, a fact which simplifies and relieves the subsequent purification steps. The step of refrigerating the gases from $b$ after treatment with the copper solution, which has heretofore been made use of in some instances, can be entirely eliminated. It seems that the removal of carbon monoxide from a gas by means of a copper solution is due to a chemical reaction between the carbon monoxide and copper with formation of a complex chemical compound containing both the copper and the carbon monoxide. It was found by experiment that a low temperature copper solution, in spite of the fact that a decrease in temperature tends to decrease the rate of a chemical reaction and therefore apparently retards the formation of the complex copper compound, nevertheless causes an increase of net efficiency probably due to the increased stability of the formed compound at the low temperature. It seems also to be the fact that after a certain degree of low temperature has been reached, no substantial increased efficiency will develop by reducing the temperature further. Thus, although with the specified solution and the specified conditions the cooling might be carried, say to —5° C., no appreciable advantage accrues therefrom over the use of a 0° C. temperature.

Attention is also called to the fact that the process described in this specification is a continuous process. Heretofore it has been proposed to regenerate the copper solution by a process which may be termed a batch process wherein the spent solution is collected in one storage tank for subsequent regeneration while the solution which circulates through the tower corresponding to 1 was withdrawn from a second tank containing regenerated solution, a third tank being simultaneously used for regeneration. When the second tank was empty, it was used as the collecting tank for spent solution while the first tank was used for regeneration and the third tank, now containing regenerated solution, was used to supply circulating liquid. That a continuous operation is far more satisfactory and more desirable in that less solution and less storage capacity is needed for a given installation, is apparent. Operating conditions also are more uniform. It has been proposed to withdraw the spent solution from a tower corresponding to the tower 1 and at once to heat and blow air through the solution, returning it immediately to the tower. The solution under such conditions will not, however, remain constant in composition, so that, although the operation may be described as continuous with reference to a short period of time, it cannot be fairly termed continuous when considered as an industrial process functioning day in and day out and without interruption month after month. Finally it is to be noted that the gas from $o$ contains both all the carbon monoxide removed from the gas entering the system at $a$ (with the exception of that small portion which was oxidized to carbon dioxide) and also all the nitrogen and hydrogen which as in the de Jahn process may be removed from the gas by solution in the copper fluid due to the excess pressure existing in tower 1. This gas, referring again to the de Jahn process, can now be returned to the crude nitrogen-hydrogen-carbon monoxide gas before its treatment with steam and a catalyst. The result is that practically all the carbon monoxide of the crude gas is made available for the production of hydrogen and all this hydrogen and all the hydrogen and nitrogen of the crude gas is recovered and made available for ammonia synthesis.

In brief then, my process presents the following advantages:

1. Simplicity—its operation, as compared with former practice, is essentially merely a question of temperature control and some extra pipe lines.

2. A great decrease in ammonia consumed in the process. Without a recovery system the loss of ammonia from the copper solution may result, in the case of the purification of a 3:1 hydrogen-nitrogen gas, to as much as 5% of the total ammonia produced from the gas so purified.

3. The almost automatic functioning of the whole plant.

4. The maintenance of uniform operating conditions and consequently uniform results, the circumstance that every change in condition is a gradual one and that there are no sudden or violent variations or fluctuations of conditions at any point. This is a function of the continuous feature of my process.

5. The certainty that no unregenerated solution will accidentally or otherwise be pumped through and get into tower 1. In view of the closed system and the continuous nature of the de Jahn ammonia process and the injurious effect of even so-called traces of CO on many ammonia catalysts, this feature of my process is an important insurance against poisoning of the catalyst and a guarantee of satisfactory operation of the ammonia process as a whole.

6. Increased efficiency both as to economy of operation and degree of purification as a result of the preferred low temperature operation of my process.

7. The carbon monoxide, together with the nitrogen and hydrogen content of the evolved gas, if any, is recovered in such condition that it can be returned to subsequent portions of the crude gas and thus utilized as originally intended. There is no loss of the desirable ingredients of the crude gas. This is of particular advantage in the application of my process to ammonia synthesis.

There are many other advantages but those which have been pointed out will suffice to show the importance in value of the invention. It is, of course, understood that the invention is not limited to any particular process for the synthesis of ammonia, but can be satisfactorily practiced in conjunction with any process which involves the removal of or the production of carbon monoxide for any purpose and in which an ammoniacal cuprous solution is the removing agent. It is also obvious that my invention is not limited to the particular type or arrangement of apparatus shown in Fig. 1 of the drawing. For example, so far as the regeneration of the spent solution is concerned and the return of the evolved ammonia to the solution, the purposes of the apparatus 3, 4, 5, 6 and 7 may also be served by any suitable sequence of towers or even by a single tower through which the copper solution passes. Such an arrangement is illustrated in Fig. 3 in which air is shown as being introduced at the bottom of the tower or tank 37 and the temperature throughout the tower is approximately regulated to correspond with the temperatures in 3, 4, 5, 6 and 7, respectively. The liquid from the tower 1 is, in this case, passed directly through $d'$ to the regenerating and recovery tank or tower 37, and from the latter the liquid passes through $h$ directly through $d$ to the regenerating and recovery tank or tower 37, and from the latter the liquid passes through $h$ directly to the brine cooler 10. At $n$ and $f$ the gases evolved pass out either to the absorber 8 or to some other use or to the stack. The operations as conducted in Fig. 3, although carried out in one (or more) towers are substantially like those of Fig. 1.

The regenerating process may be conducted under reduced or increased pressure. In that case the temperature in tank 7 will obviously not have to be 70–75° C. but may be maintained respectively at a lower or higher temperature, and this is also true as to other temperatures in the regenerating system.

Should there be oxygen in the gases entering at $a$ such oxygen as is absorbed by the copper solution will function in the regenerating system to oxidize cuprous copper to cupric and some CO to $CO^2$, in approximately the same manner as the oxygen of the air introduced through the air lift 11. The fact that the regenerating system, considered from the standpoint of CO removal, also has the capacity of dealing with absorbed oxygen on lines directly in harmony with CO removal, renders the cuprous absorption process with the described regenerating system of special advantage for the purification of ammonia synthesis gas, since that gas requires almost complete freedom from oxygen before it can be submitted to the catalyst.

I claim:

1. That improvement in the process of recovering ammonia from gas evolved in the regeneration of ammoniacal cuprous solution containing carbon monoxide which comprises treating the elolved gas with unregenerated ammoniacal cuprous solution.

2. That improvement in the process of recovering ammonia from gas evolved in the regeneration of ammoniacal cuprous solution containing carbon monoxide which comprises treating the evolved gas with unregenerated ammoniacal cuprous solution and then with a liquid capable of absorbing ammonia.

3. In the process of removing carbon monoxide from gas mixtures by treating the mixture with an ammoniacal cuprous solution that improvement which comprises bringing the gas evolved in the regeneration of the copper solution into contact with unregenerated ammoniacal cuprous solution.

4. In the process of removing carbon monoxide from gas mixtures containing it by means of ammoniacal cuprous solution that improvement which comprises bringing the gas evolved at a stage of the regeneration into contact with unregenerated ammoniacal cuprous solution which has not yet reached that stage.

5. In the process of removing carbon monoxide from gas mixtures containing it by treating the mixture with ammoniacal cuprous solution and subsequently regenerating the solution; that improvement which comprises gradually raising the temperature of the ammoniacal cuprous solution after its contact with the gas mixture and bringing gas evolved at the higher temperatures into contact with said ammoniacal cuprous solution at lower temperatures.

6. In the art of removing carbon monoxide from gas mixtures by means of ammoniacal cuprous solution and of restoring the efficiency of such cuprous solution that improvement which comprises gradually raising its temperature in stages and bringing the gas evolved at one temperature stage into contact with solution at an earlier stage.

7. That improvement in the process of removing carbon monoxide from gas mixtures which comprises circulating ammoniacal cuprous solution in contact with and countercurrent to the gas mixture, then circulating the resultant spent solution through zones of gradually increasing temperature, while circulating further portions of the spent solution in contact with the evolved gas thereby causing liberation of the absorbed carbon monoxide and reabsorption of ammonia evolved at the higher temperatures and finally recirculating that part of the solution which has passed through the region of highest temperature in contact with and countercurrent to further quantities of the gas mixture.

8. The process of depriving a gas mixture of its carbon monoxide content by bringing the gas mixture into contact with ammoniacal cuprous solution at a pressure above atmospheric, releasing the pressure of the spent solution to about atmospheric, gradually heating the solution to cause removal therefrom of carbon monoxide, bringing portions of the spent solution into contact with the gas from the heated solution, passing an oxygen-bearing gas through that portion of the solution which has been subjected to the maximum temperature treatment and then cooling and bringing the cold regenerated solution into contact with further quantities of the gas to be purified, thus completing the cycle.

9. The process of removing carbon monoxide from a gas which comprises bringing the gas in contact with ammoniacal cuprous solution, regenerating the resulting spent ammoniacal cuprous solution by gradually raising its temperature and treating it with oxygen containing gas, bringing the thus regenerated cuprous solution into contact with further quantities of the carbon monoxide containing gas thus completing the cycle and recovering ammonia from gas evolved during regeneration of the copper solution and returning it to the cuprous solution by bringing the evolved gas into contact with unregenerated solution.

10. That improvement in the process of utilizing the carbon monoxide of a gas mixture in the manufacture of hydrogen, suitable for ammonia synthesis, which consists in bringing the gas in the presence of steam into contact with a catalyzer suitable for the oxidation of carbon monoxide to carbon dioxide with the production of an equal volume of hydrogen, absorbing the residual unconverted carbon monoxide in ammoniacal cuprous solution, recovering the absorbed carbon monoxide by circulating such cuprous solution through zones of gradually increasing temperature to cause evolution of the said carbon monoxide from the said solution; and finally returning the recovered carbon monoxide to the raw gas supply for renewed exposure to the catalyst.

11. That improvement in the process of preparing a gas mixture containing nitrogen and hydrogen in the proportion of one to three which comprises producing a gas mixture in which the nitrogen content is approximately one-third of the sum of the hydrogen and carbon monoxide content by volume, bringing the gas together with steam into contact with a catalyst adapted to the oxidation of carbon monoxide to carbon dioxide with the production of an equal volume of hydrogen, absorbing the residual unconverted carbon monoxide in ammoniacial cuprous solution, recovering the absorbed carbon monoxide together with dissolved nitrogen and hydrogen by heating such cuprous solution gradually and bringing the gas evolved at the higher temperatures into contact with ammoniacal cuprous solution at the lower temperatures and finally returning the resultant recovered gas to the gas mixture prior to its exposure to the catalyst.

12. The process which consists in bringing a gaseous mixture containing carbon monoxide, in contact with an ammoniacal cuprous solution which will remove such carbon monoxide from said gaseous mixture, separating the purified gas from the solution, bringing the solution to a higher temperature to drive out the absorbed carbon monoxide, treating the solution with an oxygen-bearing gas; refrigerating the solution after removal of the carbon monoxide and after the said oxidation treatment, and returning the cooled regenerated solution to renewed contact with gases to be deprived of their carbon monoxide content.

13. The process which consists in bringing a gaseous mixture containing carbon monoxide, in contact with an ammoniacal cuprous solution which will remove such carbon monoxide from said gaseous mixture, separating the purified gas from the solution, bringing the solution to a higher temperature by successive steps driving out ammonia and the absorbed carbon monoxide, treating the solution with an oxygen-bearing gas until the solution is regenerated, conducting such ammonia from a stage of higher temperature back into contact with the solution at a point of lower temperature, refrigerating the regenerated solution and returning the cool regenerated solution to renewed contact with gases to be deprived of their carbon monoxide content.

14. The process which consists in bringing a gaseous mixture containing carbon monoxide, in contact with an ammoniacal cuprous solution which will remove such carbon monoxide from said gaseous mixture, separating the purified gas from the solution, bringing the solution to a higher temperature by successive steps, driving out ammonia and absorbed carbon monoxide, conducting such ammonia from a step of higher temperature back into contact with the solution at a point of lower temperature and at the highest temperature injecting air to complete the regeneration of the solution; removing from the system at a lower temperature point carbon dioxide together with the carbon monoxide and any other constituents there remaining in gaseous form, refrigerating the regenerated cooled regenerated solution and returning the cooled regenerated solution to renewed contact with gases to be deprived of their carbon monoxide content.

15. The process which consists in bringing a gaseous mixture containing carbon monoxide, in contact with an ammoniacal cuprous solution which will remove such carbon monoxide from said gaseous mixture, separating the purified gas from the solution, bringing the solution to a higher temperature by successive steps driving out ammonia and absorbed carbon monoxide, conducting such ammonia from a step of higher temperature back into contact with the solution at a point of lower temperature, regenerating the solution from which the gases were evolved, refrigerating the regenerated solution, strengthening the regenerated ammoniacal cuprous solution with ammonia from an outside source, and returning the cool regenerated solution to renewed contact with gases to be deprived of their carbon monoxide content.

16. The process which consists in bringing a gaseous mixture containing carbon monoxide, in contact with an ammoniacal cuprous solution which will remove such carbon monoxide from said gaseous mixture, separating the purified gas from the solution, bringing the solution to a higher temperature by successive steps, driving out ammonia and absorbed carbon monoxide, conducting such ammonia from a step of higher temperature back into contact with the solution at a point of lower temperature and at the highest temperature injecting air to complete the regeneration of the solution; removing from the system at a lower temperature point carbon dioxide together with the carbon monoxide and any other constituents there remaining in gaseous form, refrigerating the regenerated solution, strengthening the regenerated ammoniacal cuprous solution with ammonia from an outside source and returning the cool regenerated solution to renewed contact with gases to be deprived of their carbon monoxide content.

17. The process of freeing gases from carbon monoxide which consists in continuously subjecting such gases to an ammoniacal cuprous solution capable of absorbing carbon monoxide, continuously flowing the solution from said absorption stage through a regenerating system and the regenerated solution back to the absorption stage, continuously withdrawing the gases evolved in the regenerating system and at a predetermined part of said regenerating system establishing and maintaining a condition of predetermined constancy of composition of the solution.

18. That improvement in the process of recovering ammonia from gas evolved in the regeneration of ammoniacal cuprous solution containing carbon monoxide, which comprises treating the evolved gas with unregenerated ammoniacal cuprous solution while treating that portion of the solution from which the gas was evolved, with an oxygen-bearing gas.

In testimony whereof I have hereunto set my hand.

JOSEPH G. DELY.

Certificate of Correction.

It is hereby certified that in Letters Patent No. 1,597,345, granted August 24, 1926, upon the application of Joseph G. Dely, of Syracuse, New York, for an improvement in " Processes Relating to Gas Purification by Ammoniacal Cuprous Solutions," errors appear in the printed specification requiring correction as follows: Page 2, line 70, for the letter " c " read *o;* page 3, line 3, for " otherwise it will " read *otherwise. It will;* page 5, line 118, claim 1, for the misspelled word " elolved " read *evolved;* and that the said Letters Patent should be read with these corrections therein that the same may conform to the record of the case in the Patent Office.

Signed and sealed this 2d day of November, A. D. 1926.

[SEAL.]

WM. A. KINNAN,
*Acting Commissioner of Patents.*